Nov. 21, 1950  J. J. GULLEN  2,530,959

SPECTACLE MOUNTING

Filed Feb. 28, 1948

INVENTOR.
JAMES J. GULLEN
BY
ATTORNEY

Patented Nov. 21, 1950

2,530,959

UNITED STATES PATENT OFFICE 2,530,959

SPECTACLE MOUNTING

James J. Gullen, Rochester, N. Y., assignor to Rochester Optical Manufacturing Co., Inc., Rochester, N. Y., a corporation of New York Application February 28, 1948, Serial No. 12,050

4 Claims. (Cl. 88—41)

1

The present invention relates to spectacle frames and particularly to the so-called semi-rimless type of mounting.

The semi-rimless mounting, which is one in which the rims extend only part-way around the lenses, is attractive in appearance and of reduced weight as compared with a full-rimmed spectacle made of the same material. Plastics are being used more and more in the manufacture of spectacle frames for comfort of fit and lightness. Heretofore, however, most semi-rimless mountings have been made of metal because of the difficulties with previous designs employing plastics.

Some semi-rimless mountings have been made in which the semi-rims or eye wires have been made of plastic and the bridge of metal, and the semi-rims or eye wires have been secured to the bridge by screws tapped into the plastic of the rims. This construction, however, is unsatisfactory. The plastic stretches under the weight of the lenses; the screws become loosened; strains are introduced into the plastic; and the lenses get out of correct optical position.

There is also a construction known in which the bridge and semi-rims are made of plastic and the lenses are supported from the semi-rims by thin metal half-rings that are secured to and suspended from the plastic semi-rims. Each half ring is fastened at one end to one side of a semi-rim by a screw tapped into the plastic and is snap-hooked at its other end into the other side of the semi-rim. This construction is open to the same objections as that first described. The plastic stretches under the weight of the lenses; the screws become loosened; strains are introduced into the plastic; and the lenses get out of correct optical position. Moreover, the mounting is a semi-rimless mounting in name only, for the half-rings really make with the semi-rims full rims surrounding the lenses. Furthermore, there is extra cost of the half-rings and the time required in assembling them to the frames.

One object of the present invention is to provide a semi-rimless plastic mounting in which the lenses may be firmly and securely held in correct optical position and which avoids all the objections of previous constructions.

Another object of the invention is to provide a rigid semi-rimless mounting in which both the semi-rims and the bridge are made of plastic and thereby the comfort and light weight of plastic mountings may be realized.

Other objects of the invention are to provide a semi-rimless mounting which can be made for relatively low cost and which will be easy to assemble.

2

Further objects of the invention are to provide a method for making plastic mountings and a novel mounting structure which will be highly decorative and attractive in appearance.

Still other objects of the invention will be apparent hereinafter from the specification and from the recital of the appended claims.

The mounting of the present invention is designated as a whole at 10. It includes a bridge 11 and the two semi-rims 12. These are preferably made from a single piece of plastic stock. The nose-pieces 14 are also made of plastic but from separate pieces of stock and adhered to the rest of the mounting after it has been stamped out, although they may also be made from the same piece of stock as the bridge and semi-rims. The stock from which these various parts are made may be a single thickness of plastic of suitable thickness and of any desired color and formation, or it may be laminated as will hereinafter be described.

Figure 1:
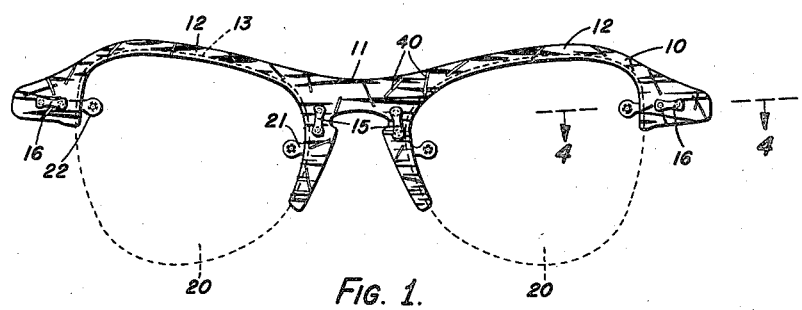
Figs. 1 and 2 are front and rear elevations, respectively, of a semi-rimless mounting made according to one embodiment of this invention, the lenses being shown in dotted lines.
Figure 2:
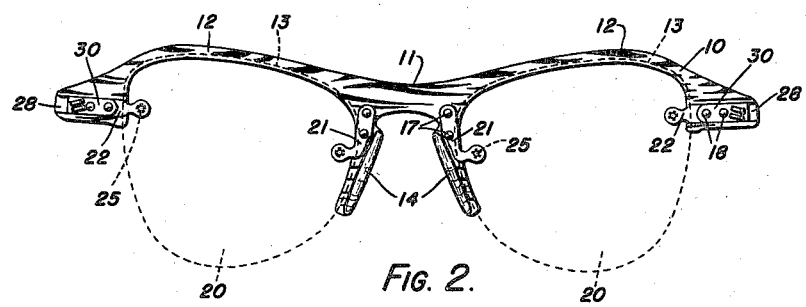
Figure 3:
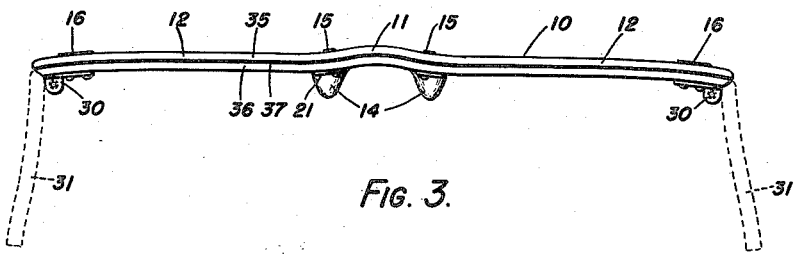
Fig. 3 is a plan view of the mounting, the temples or bows being shown only fragmentarily and in dotted lines.

The semi-rims 12 are grooved to receive the lenses 20 of the spectacle. These grooves 13 are indicated in dotted lines in Figs. 1 and 2 and are also shown fragmentarily in Fig. 5.

One of the principal features of the invention is the manner of supporting the lenses. It is the custom to provide ornamental metallic plates of silver or gold on the fronts of plastic spectacle frames for decorative effect. I make use of these in supporting the lenses. In the mounting shown, there are two vertical decorative plates 15 at the two sides of the bridge and two horizontal decorative plates 16 at the outsides of the semi-rims. These plates may be of any suitable shape or contour.

In the mounting shown, each decorative strip 15 is provided with a pair of pins 17 (Fig. 5) which project rearwardly from its rear face. Likewise each decorative strip 16 is provided with two pins 18 (Fig. 4) which project rearwardly from its rear face.

Each lens 20 is secured at opposite sides to straps 21 and 22 by screws 25. These screws pass through holes in the lenses and thread into holes 26 and 27, respectively, in the straps. This is a common method of fastening lenses in spectacle frames and need not further be described.

The two straps 21 are right-angular in shape and are positioned on the rear face of the mounting alongside the nose-pieces 14. Each strap 21 has holes 23 (Fig. 5) in it which are adapted to be aligned with the pins 17 of a plate 15. The pins 17 are adapted to be passed through holes 24 drilled in the mounting and through the holes 23 in the straps and to be peened over the straps to secure the straps in position on the mounting.

Figures 4, 5, 6, 7:
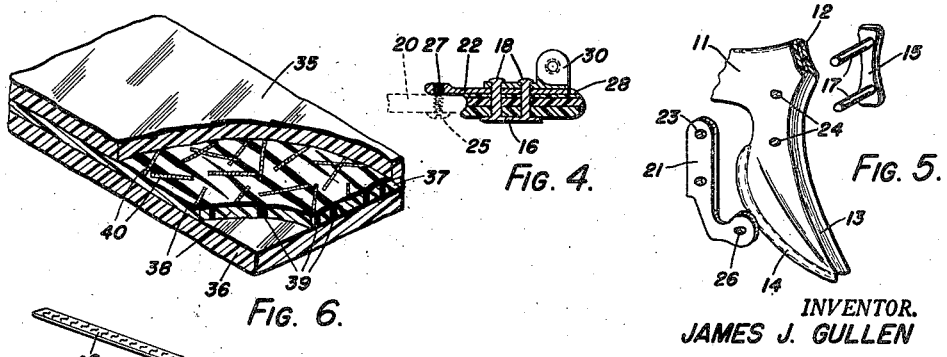
Fig. 4 is a sectional view on an enlarged scale taken on the line 4—4 of Fig. 1.
Fig. 5 is an exploded perspective view on a still further enlarged scale showing details of the mounting.
Fig. 6 is a fragmentary perspective view showing the structure of the stock from which the highly decorative plastic mounting illustrated is manufactured.
Fig. 7 is a perspective view on a greatly enlarged scale showing one of the gold or silver strips used in the stock.

The mounting 10 is provided on its back face at the extremities of its semi-rim portions with grooves 28. The straps 22 are adapted to be positioned in these grooves. These straps are adapted to be placed under the hinge pieces 30 by which the temples 31 are hinged to the mounting. Then a hinge piece 30, strap 22, and plate 16 are secured together on the mounting by passing the pins 18 of the plate through aligned holes drilled in the mounting, plate and hinge-piece and by peening the pins over the hinge-piece as shown in Fig. 4.

With the mounting of the present invention, the lenses are rigidly held in correct optical position. They do not depend for their support upon screws tapped into plastic. They are secured to straps which are supported by metal, namely, the pins of the front plates; and there are no screws or pins to pull out of plastic. Moreover, with the mounting of this invention, the hinge-pieces for the temples are more firmly held than in any known type of plastic spectacle frame, for they, too, are secured on metal supports rather than being simply held by screws threaded into plastic as in previous constructions. The hinge-pieces moreover serve to hold the lens-supporting straps 22 in place and thereby strengthen the mounting of the lenses themselves.

While the hinge-pieces 30 are preferably made separate from the straps 22 as described, because the hinge-pieces are a standard commercial article, it will be understood that the straps 22 might be made integral with the hinge-pieces 30 if desired.

As already stated, bridge and semi-rims may be made of a single piece of plastic or from laminated stock. In the drawing I have illustrated, however, a preferred structure which is highly decorative and ornamental in appearance. Bridge and semi-rims are here stamped out of a piece of laminated stock made as shown in Fig. 6. This stock comprises a top layer 35 of clear plastic, a bottom layer 36 also of clear plastic and a middle plastic layer 37 which is laminated in itself but which has its laminations extending at right angles to layers 35 and 36. It has laminations 38 of clear plastic and of different widths alternating with laminations 39 of colored plastic and of different widths. The several laminations 38 and 39 may each vary in width along their lengths as shown in Fig. 6. On top of the middle layer and embedded therein are also scattered pieces 40 of silver or gold crinkly lahn. These are very fine metal strips which may be indented or otherwise crinkled to improve their light reflecting qualities.

The center layer 37 may be made by adhering strips 38 and 39 of differently colored plastic together under heat and pressure after having first scattered on the top of them the strips 40 of crinkly lahn. The piece of stock itself is then made by placing the clear layers 35 and 36 on top and bottom, respectively, of the center layer and adhering the three layers together under heat and pressure to form an integrated structure.

The stock may be made up in the usual sizes of plastic stock for spectacle frames, and mountings 10 may be stamped from it in the customary manner of making plastic mountings. The variegated effect produced by the multi-colored central layer 37 showing through the clear outside and inside layers 35 and 36 is enhanced by the light-reflecting strips 40 of the crinkly lahn and the whole provides a very attractive, fine-appearing mounting. Because there is a minimum of metal in this mounting it is light in weight. Moreover, it possesses all the comfort and other advantages of a full plastic mounting.

While the invention has been described in connection with a particular embodiment thereof, it will be understood that it is capable of further modification, and that this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a spectacle mounting, the combination of a frame comprising a non-metallic bridge and a pair of non-metallic semi-rims integral therewith, each semi-rim being internally grooved to receive a portion of the periphery of a lens and having a nasal, a top, and a temporal portion, a metallic hinge-piece at the rear of the temporal portion of each semi-rim and adapted to have one of the temples of the spectacle secured thereto, a rigid metallic strap secured to each hinge-piece and projecting laterally thereof and adapted to have a lens secured to its projecting end, an ornamental metal plate mounted at the front of the temporal portion of each semi-rim in axial alignment with the hinge-piece of that semi-rim, and metallic pins extending through each semi-rim and securing the associated plate, metallic strap, and aligned hinge-piece of that semi-rim together.

2. In a spectacle mounting, the combination of a frame comprising a non-metallic bridge and a pair of non-metallic semi-rims integral therewith, each semi-rim being internally grooved to receive the peripheral portion of a lens and having a nasal, a top, and a temporal portion, a metallic hinge-piece at the rear of the temporal portion of each semi-rim and adapted to have one of the temples of the spectacle secured thereto, a rigid metallic strap between each hinge-piece and the temporal portion of the corresponding semi-rim, said strap projecting laterally from the temporal portion of the semi-rim and being adapted to have a lens secured thereto, an ornamental metal plate at the front of the temporal portion of each semi-rim in axial alignment with the strap and hinge-piece of that semi-rim, and metallic means extending through each semi-rim to secure the associated plate, aligned strap and hinge-piece of that semi-rim together.

3. In a spectacle mounting, the combination of a frame for supporting the lenses comprising a non-metallic bridge and a pair of non-metallic semi-rims integral therewith, each of said semi-rims being internally grooved to receive the peripheral portion of a lens and having a nasal, a top, and a temporal portion, a pair of rigid, metal straps at the back of each semi-rim, the two straps of each pair projecting laterally toward one another from the nasal and temporal portions, respectively, of each semi-rim, screws for detachably securing a lens at opposite sides thereof to a pair of nasal and temporal straps, a pair of metallic hinge-pieces for the temples of the spectacles, metallic plates at the fronts of the two semi-rims in axial alignment with the several straps, metallic means passing through each of the nasal portions of the frame for securing the strap which is at the back of each nasal portion to the aligned plate which is at the front of that nasal portion, and metallic means passing through each of the temporal portions of the frame for securing the plate which is at the front of that portion, the aligned strap which is at the back of that portion, and the associated hinge-piece together.

4. In a spectacle mounting, the combination of a frame for supporting a pair of lenses comprising a non-metallic bridge and a pair of non-metallic semi-rims integral therewith, each of said semi-rims having a nasal, a top, and a temporal portion and being grooved internally to receive one of the lenses, a metallic hinge-piece at the back of the temporal portion of each semi-rim, a rigid metallic strap at the back of the nasal portion of each semi-rim, a rigid metallic strap interposed between each hinge-piece and the temporal portion of each semi-rim, the straps at the nasal and temporal portions of each semi-rim projecting toward one another and being adapted to be secured to opposite sides of the lens supported within said semi-rim, two ornamental metallic plates at the front of the nasal and temporal portions of each semi-rim and axially aligned, respectively, with the two metallic straps at the back of that semi-rim, said plates having rivets integral therewith which pass through the semi-rims and secure together, respectively, each nasal plate and its aligned nasal strap and each temporal plate, its aligned temporal strap, and the hinge-piece associated therewith.

JAMES J. GULLEN.

REFERENCES CITED

The following references are of record in the file of this patent:

UNITED STATES PATENTS

| Number | Name | Date |
|---|---|---|
| 1,235,842 | Reagan | Aug. 7, 1917 |
| 1,322,631 | Sezall | Nov. 25, 1919 |
| 1,510,001 | Gunning | Sept. 30, 1924 |
| 1,555,388 | Schumacher | Sept. 29, 1925 |
| 1,642,090 | Shyer | Sept. 13, 1927 |
| 1,729,901 | Simonds et al. | Oct. 1, 1929 |
| 1,747,904 | Nerny | Feb. 18, 1930 |
| 1,778,726 | Pappert | Oct. 21, 1930 |
| 2,257,812 | Pomeranz | Oct. 7, 1941 |
| 2,269,037 | Oker | Jan. 7, 1942 |
| 2,355,053 | Carlson | Aug. 8, 1944 |
| 2,392,418 | Splaine | Jan. 8, 1946 |
| 2,436,606 | Rohrbach | Feb. 24, 1948 |
| 2,452,159 | Small | Oct. 26, 1948 |
| 2,463,956 | Ellestad | Mar. 8, 1948 |

FOREIGN PATENTS

| Number | Country | Date |
|---|---|---|
| 466,034 | Great Britain | May 20, 1937 |

OTHER REFERENCES

"Decorative Laminated Spectacle Frame," of Dr. David L. Rose, Washington, D. C., May 1947.